United States Patent [19]
Tamai et al.

[11] 3,943,490
[45] Mar. 9, 1976

[54] CHARACTER SIGNAL PROCESSING SYSTEM

[75] Inventors: Masaharu Tamai, Tokyo; Shigeo Tanaka, Kawasaki, both of Japan

[73] Assignee: Fujitsu Limited, Japan

[22] Filed: Nov. 8, 1974

[21] Appl. No.: 522,285

[30] Foreign Application Priority Data
Nov. 9, 1973 Japan.................. 48-126412

[52] U.S. Cl. ............................. 340/146.3 AG
[51] Int. Cl.² ............................... G06K 9/12
[58] Field of Search ......... 340/146.3 MA, AG, H

[56] References Cited
UNITED STATES PATENTS

| | | | |
|---|---|---|---|
| 3,016,518 | 1/1962 | Taylor | 340/146.3 MA |
| 3,833,883 | 9/1974 | Haupt et al | 340/146.3 AG |
| 3,737,855 | 6/1973 | Cutaia | 340/146.3 AG |
| 3,723,970 | 3/1973 | Stoller | 340/146.3 AG |
| 3,715,724 | 2/1973 | Demonte et al | 340/146.3 AG |
| 3,564,498 | 2/1971 | Stern | 340/146.3 AG |

*Primary Examiner*—Leo H. Boudreau
*Attorney, Agent, or Firm*—Staas & Halsey

[57] ABSTRACT

Disclosed is a character signal processing system in which when character information is quantized into binary signals, the binary signal of a point to be quantized is determined by comparing the brightness level of a central part including the point to be quantized with the highest brightness level of small areas surrounding the point to be quantized. With this system, a change in the width of a character stroke caused by non-uniformity of print quality is absorbed and spot noises are removed, so that a character recognizing unit of high performance can be obtained.

12 Claims, 25 Drawing Figures

F I G. 7A       F I G. 7B
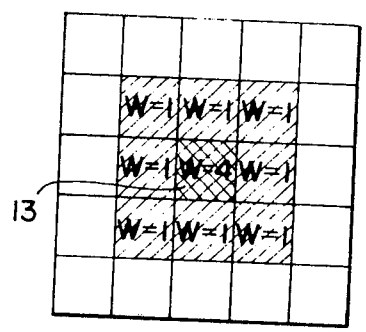 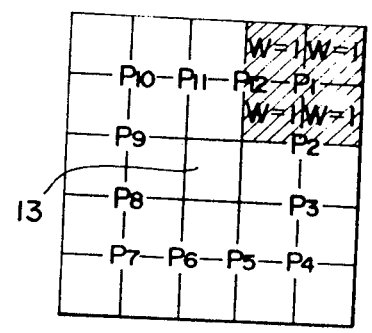
FIG. 15A
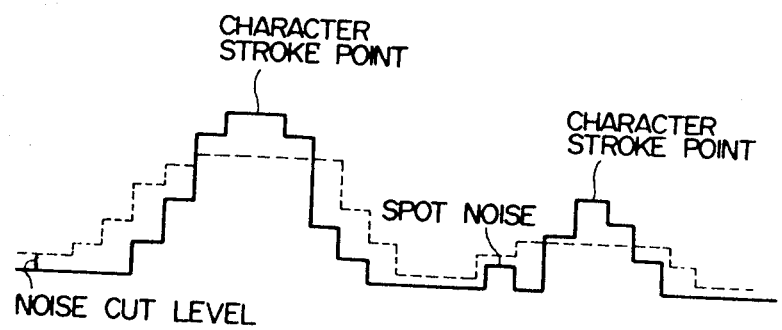
FIG. 15B

FIG. 9A
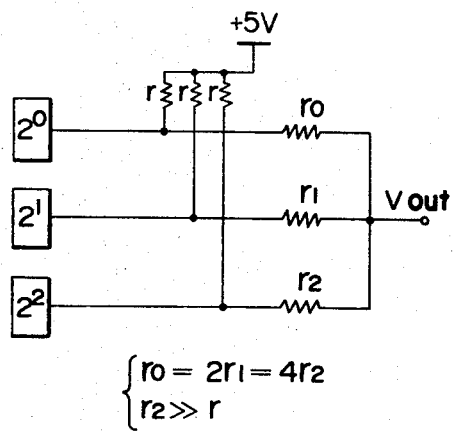
$$\begin{cases} r_0 = 2r_1 = 4r_2 \\ r_2 \gg r \end{cases}$$
FIG. 9B
| V out | $2^0$ | $2^1$ | $2^2$ |
|---|---|---|---|
| 0 | 0 | 0 | 0 |
| $5 \times \frac{1}{7}$ | 1 | 0 | 0 |
| $5 \times \frac{2}{7}$ | 0 | 1 | 0 |
| $5 \times \frac{6}{7}$ | 0 | 1 | 1 |
| $5 \times \frac{7}{7}$ | 1 | 1 | 1 |
FIG. 10
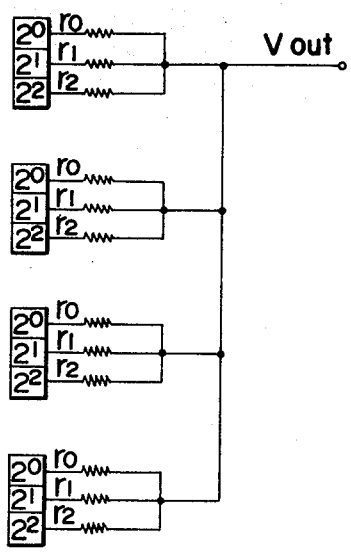
FIG. 11
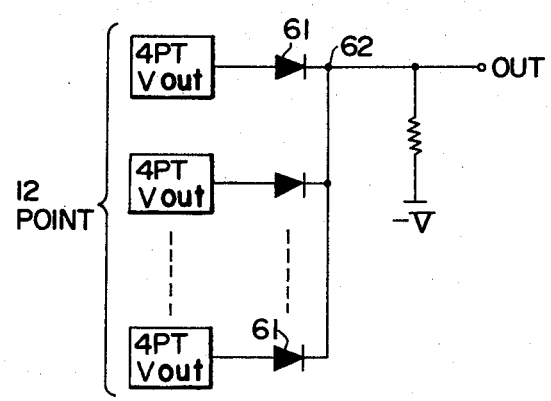

F I G. 13A
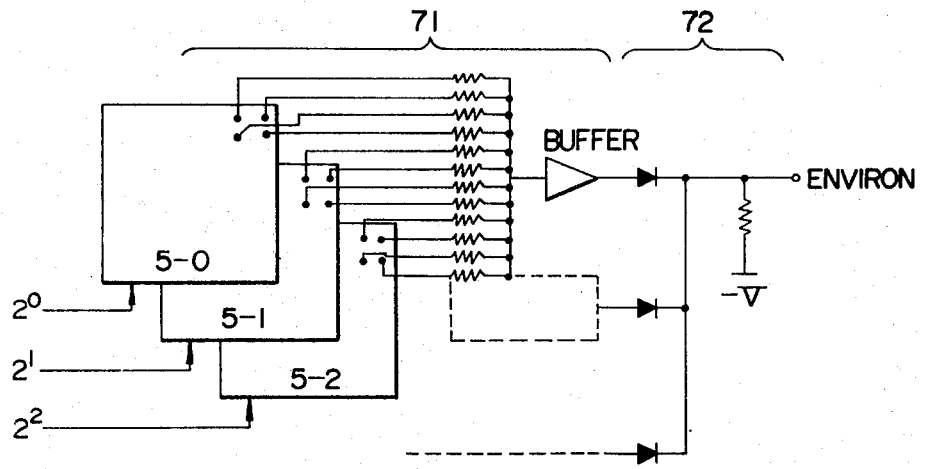
F I G. 13B
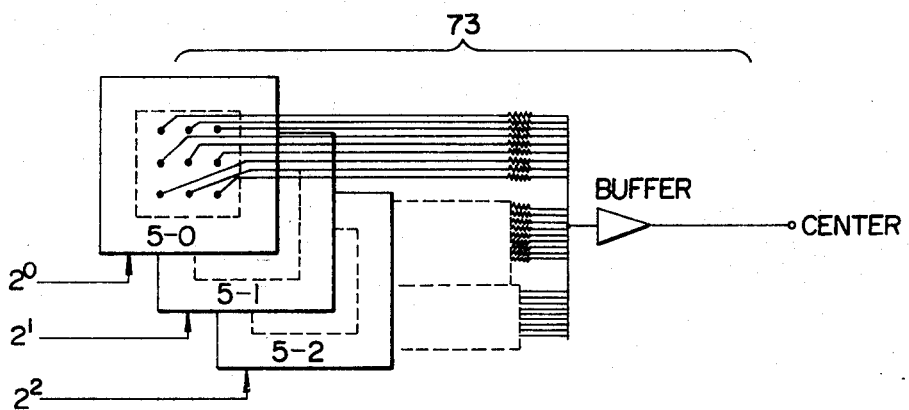
F I G. 14
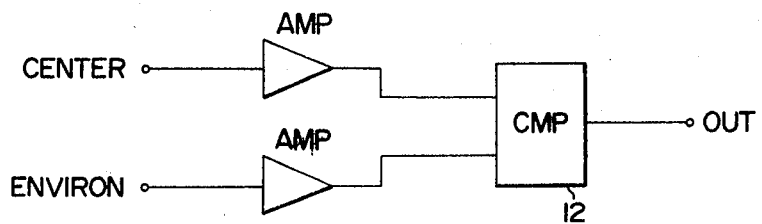

CHARACTER SIGNAL PROCESSING SYSTEM

BACKGROUND OF THE INVENTION

Field of the Invention

This invention relates to a character signal processing system, and more particularly to an excellent character signal processing system in which a change in the width of a character stroke resulting from non-uniformity of the print quality is absorbed and a spot noise or the like is removed to thereby provide for enhanced efficiency in character recognition.

Description of the Prior Art

Character recognition is one important field of pattern recognition and it is a very difficult problem to accurately recognize a character without affections of its deformation, spot noises and so on.

Generally, in a character recognition unit, a printed character is scanned prior to recognition, so that white and black levels of the printed character are respectively converted into a binary signal "1" or "0" to be quantized. In scanning the character, an analog signal brightness which continuously changes is quantized into two states with respect to an appropriate level, but the print quality of the printed character differs over a wide range according to the condition of a printer used and, even if the same character is printed, its print quality changes according to the place where the character is printed, the quality of paper used, illumination, etc. Further, in some cases, non-uniformity of the print quality of the printed character is quantized as it is, or small spot noises around the character are also quantized as they are. The quantization of non-uniformity or spot noises disturbs recognition of the character. To avoid this, a method has been employed in which brightness information of a mesh point to be quantized and that of adjoining meshes are obtained and binary information of the mesh point to be quantized is determined in relation to the adjoining meshes. This conventional method is very effective, but the brightness levels of the adjoining mesh points are averaged and then compared with the brightness level of the mesh point to be quantized. Accordingly, for example, in the case where a character stroke covers half a mesh point B to be quantized and those adjoining mesh points A, A, . . . which are covered by the character stroke and those which are not covered by the character stroke are also substantially equal in number to each other, as shown in FIG. 1, the brightness level of the mesh point B to be quantized becomes substantially equal to that of each of the adjoining mesh points, so that quantization is difficult. Further, due to a noise in each brightness level signal, the same mesh point is quantized as a white or black state, and such an affection of the noise introduces much difficulty in character recognition.

In this case, even if a weight is added to the brightness level of the mesh point B for comparison with those of the adjoining mesh points, it is not a fundamental solution of the problem. Although the addition of a weight to the brightness level of the mesh point B is somewhat effective in the case mentioned above, but on the other hand, spot noises cannot be removed and the possibility of quantizing them is great.

SUMMARY OF THE INVENTION

This invention has for its object to provide a character signal processing system for a character recognition unit which is free from the aforesaid defects in the quantizing means encountered in the prior art.

The character signal processing system of this invention, for a character recognition unit of the type performing a character recognizing operation by quantizing character darkness information into white or black states comprises: means for extracting the darkness information of an input character as brightness level information from each of $(m \times n)$'s meshes forming a plane observation area; a first arithmetic unit for operating, by the output from the extracting means, on the sum of outputs of a predetermined number of meshes of the central part of the plane observation area including its central point; one or more second arithmetic units for operating, by the output from the extracting means, on the sum of outputs of meshes of each of a predetermined number of small areas surrounding the aforesaid central point of the plane observation area; and a maximum peak select unit for selecting the maximum of the output sums of the aforementioned small areas. The darkness information at the center of the plane observation area is quantized based on the outputs from the first arithmetic unit and the maximum peak select unit. Briefly, the brightness level of a central part of a certain area including a point to be quantized and the brightness levels of small areas surrounding the point to be quantized are compared with each other. Where the brightness level of the former is lower than the highest one of the latter, the point to be quantized is regarded as a white bit. By making a threshold value to be quantized variable with surrounding information, a change in the width of a character stroke resulting from non-uniformity of the print quality is absorbed and the spot noise is removed.

BRIEF DESCRIPTION OF THE DRAWINGS

FIGS. 7A and 7B show examples of selection of meshes of the central and peripheral parts of the video matrix storage, respectively;

FIGS. 9A and 9B are a basic connection diagram showing one example of an adder circuit in FIG. 6, and a diagram for explaining its operation, respectively;

FIG. 10 is a connection diagram of an adder circuit for four meshes in FIG. 7B;

FIG. 11 is a connection diagram illustrating one example of a maximum peak select unit in FIG. 6;

FIGS. 13A and 13B are connection diagrams of adder circuits and maximum peak select units in the environmental and central parts of the video matrix storage;

FIG. 14 is a connection diagram for a simple comparison of the output of the central part with a maximum output of the environmental part;

FIGS. 15A and 15B are diagrammatical showings of quantization by this invention;

DESCRIPTION OF THE PREFERRED EMBODIMENTS

A photoelectric conversion system employing a one-dimensional arrangement of photoconductive cells, that are semiconductor elements such as solar batteries, photo transistors or the like, are aligned perpendicular to a scanning direction. When a character printed on a paper is shifted in a horizontal direction, and is laterally scanned, a signal is derived from each photoconductive cell. A similar signal can also be obtained by the so-called raster scanning which is performed with a flying spot scanner or the like. Further, high speed scanning is possible with a two-dimensional arrangement of photoelectric cells, which are arranged in a plant. The scanning of one character as a whole is achieved at a speed determined by the response speed of the photo-electric cells.

Figure 2:
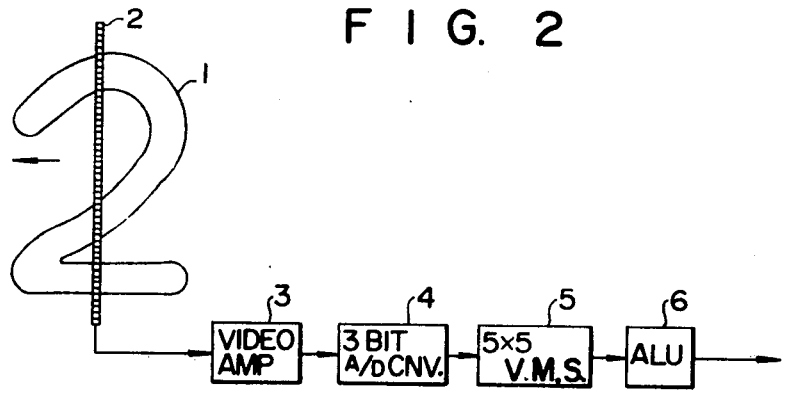
FIG. 2 is a block diagram showing one example of the character signal processing system of this invention.

FIG. 2 is a system diagram of a character signal processing unit employing the one-dimensional arrangement of photoelectric cells. In FIG. 2, reference numeral 1 indicates a character to be recognized; 2 designates an array of photo transistors; 3 represents a video amplifier; 4 denotes an A-D converter for converting the video output into a 3-bit quantized signal; 5 identifies a 5 × 5 mesh video matrix storage; and 6 shows an arithmetic unit.

The photo transistor array 2 is fixed and the input character 1 is shifted in a direction of the arrow. By scanning, for example, 64 photo transistors 2, the darkness information of the input character 1 is applied as a serial analog signal to the video amplifier 3 and amplified. The amplified analog signal output from the video amplifier 3 is converted by the A-D converter 4 into a 3-bit quantized signal. Namely, a white ground level of the video output signal is detected first, and the video output signal is sliced at respective slice levels, with the above detected level being "0" and a level of the darkness of the character printed with the highest print quality being "7", thus providing 8-level brightness information of the video output signal.

The eight levels can be represented with three bits, so that $2^0$, $2^1$ and $2^2$ digits are each set in three video matrix storages 5 of, for example, 5 × 5 meshes. The contents of the video matrix storages 5 are operated on by the arithmetic unit 6 and finally quantized into binary information of white and black states.

Now, respective parts of the system shown in FIG. 2 will be described in detail.

Figure 3:
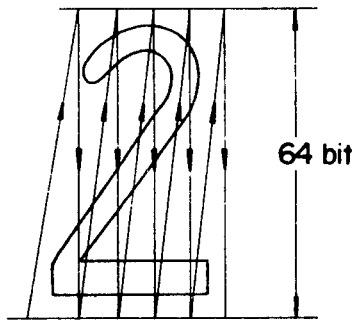
FIG. 3 is a diagram, for explaining a method of scanning a character.

FIG. 3 is a schematic diagram explanatory of the character scanning method employed in FIG. 2. Where the photo transistor array 2 is fixed and a character is shifted from right to left, upward scanning of the photo transistor array 2 is equivalent to sequential scanning of a fixed character from the left lower side to the upper right side. The length of the photo transistor array 2 is selected to be appreciably larger than the height of the character printed on the paper, so that even if the printed character moves a little up and down, scanning is possible. In the illustrated example, the length of the array 2 is divided into 64 bits (0 to 63) and one photo transistor is used for each bit.

Figure 4:
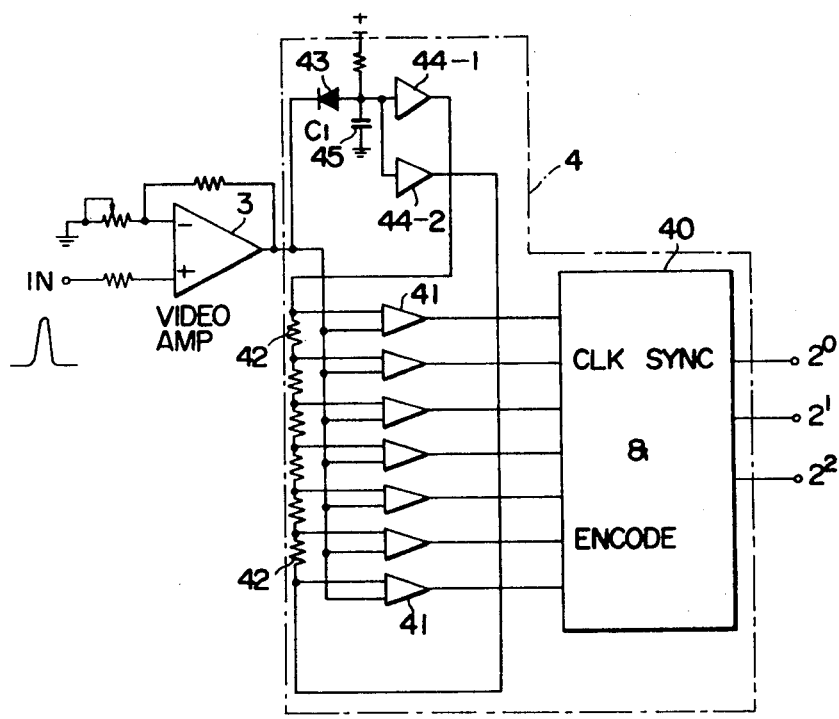
FIG. 4 is a circuit diagram illustrating one example of a video amplifier and a 3-bit A–D converter as employed in the example of FIG. 2.

FIG. 4 is a connection diagram illustrating one example of the video amplifier 3 and the 3-bit A-D converter 4 employed in FIG. 2.

In FIG. 4, reference numeral 3 indicates the video amplifier, 40 designates a clock synchronizing and encoder circuit; 41 denotes comparator circuits; 42 identifies resistance dividers; 43 represents a diode; 44-1 and 44-2 shows level shifters; and 45 refers to a capacitor. The diode 43, the level shifters 44 and the capacitor 45 make up a level follow and a level shift circuit. For example, the level shifter 44-1 produces a level (the level 0) that a white level of a video signal is shifted up corresponding to a cut noise and the level shifter 44-2 shifts up the above white level to a level (the level 7) which is higher by a predetermined value than that of the video signal corresponding to the most darkness of a character printed. Then, the signal is divided by the resistance dividers 4 between the levels of the level shifters 44-1 and 44-2 to obtain slice levels 0 to 7 for slicing.

In such a case of scanning characters with the one-dimensional element as in FIG. 3, in order that the points at positions different from one another in terms of time may be sampled and simultaneously observed, it is necessary to compensate for the time difference due to scanning. In general, a delay time of about 250 $\mu$s is required for five scanning lines but an ordinary analog delay line provides a delay of only several $\mu$s, so that there is no choice but to employ shift registers and the analog signal obtained by scanning must be converted into a digital signal. Of course, in the case of parallel scanning with a two-dimensional element, the above is not required.

In FIG. 4, an analog signal is sliced into eight, by which the signal is converted into a 3-bit quantized signal.

An analog signal obtained by photoelectric conversion, applied from an input terminal IN in FIG. 4, is amplified by the video amplifier 3 and compared with respective level potentials set by the resistors 42 and sliced signals are applied to the clock synchronizing and encoder circuit 40. Namely, after adjustment of the DC level and the amplitude of the video signal by the video amplifier 3, the video signal is sliced, by white level signals divided by the resistors 42 into seven; and then, the sliced signals are subjected to A-D conversion in the encoder circuit 40.

Further, in FIG. 4, white level fluctuation is corrected by the capacitor 45 and the diode 43 to effect a level shift. Namely, the white level fluctuates with the darkness of paper having printed thereon characters, the manner of illumination, etc., so that a level shift following the white level with a time constant of $\tau = C_1 R$ and substantially proportional to the fluctuation of the white level is achieved and slicing is effected.

Figure 5A:
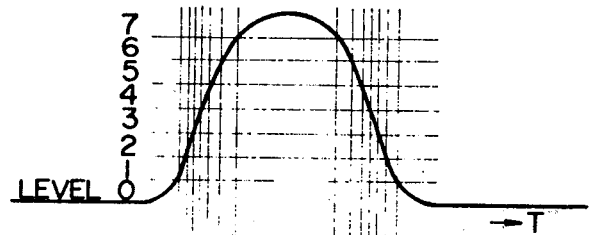
FIGS. 5A and 5B are diagrams, for explaining the operation of the circuit of FIG. 4 for converting character darkness information into 3-bit information.
Figure 5B:
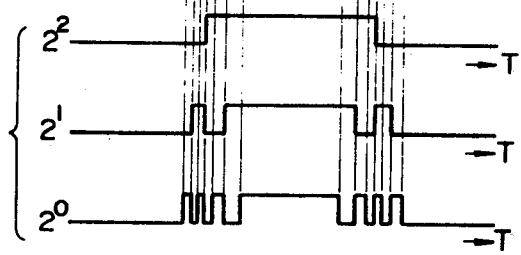

FIGS. 5A and 5B are explanatory of conversion by the 3-bit A-D converter 4 shown in FIG. 2. FIG. 5A shows the waveform of the analog output signal from the video amplifier 3 and FIG. 5B shows waveforms of brightness levels of 3 bits into which the analog output signal depicted in FIG. 5A is converted.

Namely, the analog output signal is sliced at eight levels in the A-D converter 4 and converted into binary information of 3 bits corresponding to each level. Then, the bit information of each of the $2^0$, $2^1$, and $2^2$ digits of the converted binary information is derived as a serial signal from the A-D converter 4 and applied to each of the video matrix storages 5.

Figure 6:
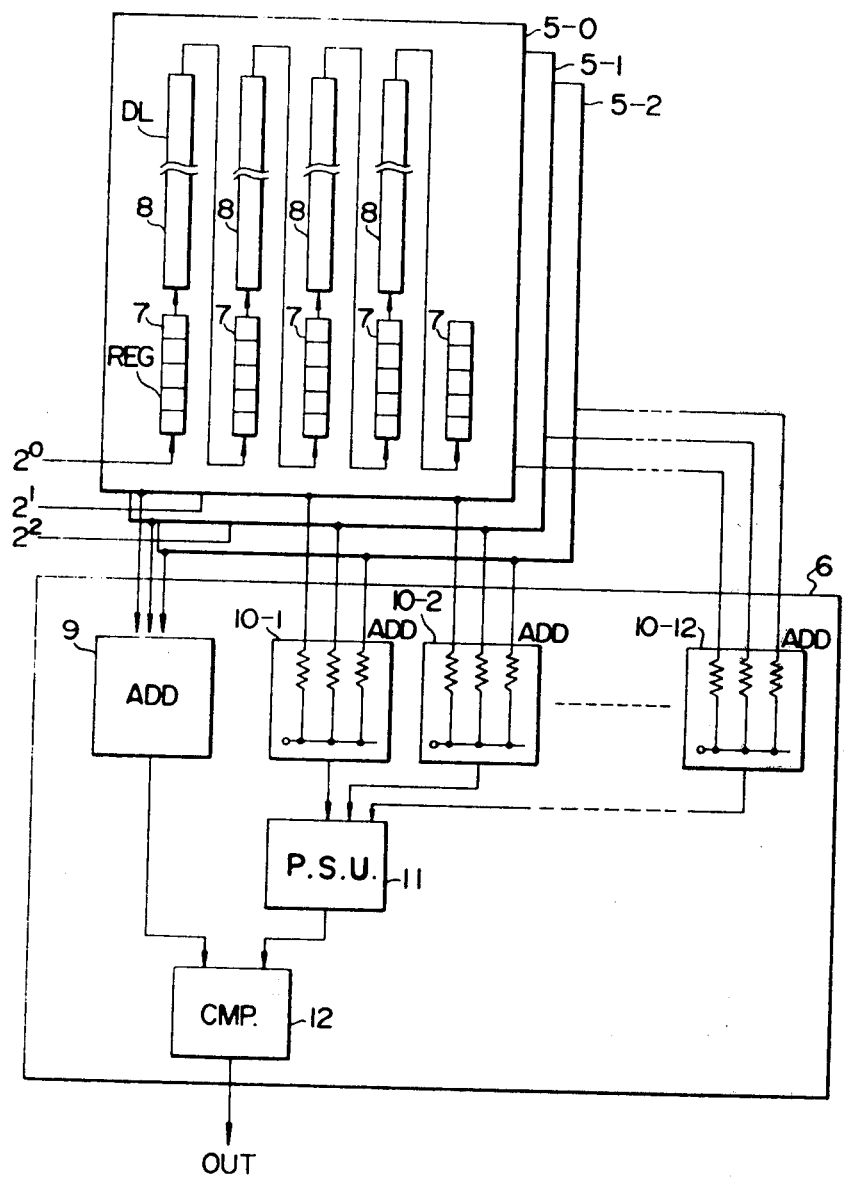
FIG. 6 is a block diagram showing one example of each of a video matrix storage and an arithmetic unit employed in the example of FIG. 2.

FIG. 6 shows the constructions of the video matrix storages 5 and the arithmetic unit 6 depicted in FIG. 2.

In FIG. 6, reference numerals 5-0, 5-1 and 5-2 indicates matrixes of $5 \times 5$ meshes for the $2^0$, $2^1$ and $2^2$ digits, respectively; 7 designates shift registers making up each of the video matrix storages; 8 identifies delay lines for adjusting one scanning time; 9 denotes an adder for the brightness level of the central part of the $5 \times 5$ meshes including the central point thereof (refer to FIG. 7A); 10-1 to 10-12 represent adders for the brightness levels of the small areas surrounding the central point (refer to FIG. 7B); 11 shows a peak select unit; and 12 refers to a comparator.

Figure 1:
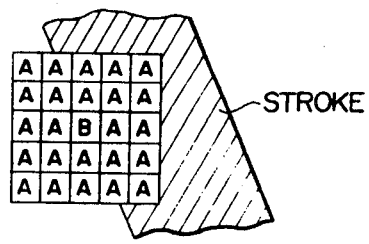
FIG. 1 is a diagram, for explaining the case where a mesh point to be quantized is covered by a character stroke.

As described previously, the binary information of each of the $2^0$, $2^1$ and $2^2$ digits is supplied to each of the matrixes 5-0, 5-1 and 5-2 from the A-D converter 4 shown in FIG. 1. Namely, in the illustrated example, when the information of the $2^0$ digit is sequentially shifted from the register 7 to the subsequent ones through the delay lines 8, there is set in each of the registers 7 "1" or "0" of the $2^0$ digit of the brightness level signal of each of given $5 \times 5$ meshes assumed to cover the input character 1. In a similar manner, the information of the $2^1$ digit of the brightness level signal of each of the $5 \times 5$ meshes is set in the matrix 5-1 and the information of the $2^2$ digit is set in the matrix 5-2.

In the adder 9, a value that the brightness level signal of the central mesh 13 of the $5 \times 5$ meshes is multiplied by a weight, for example, 4, as shown in FIG. 7A, is added with the brightness signal values of eight meshes surrounding the mesh 13. The adder 10-1 performs the additions of the brightness level signal values of the respective meshes of a small area of $2 \times 2$ meshes centering about $P_1$ around the central mesh 13 as shown in FIG. 7B. (The small areas centering about $P_1$, $P_2$, $P_3$, . . . will hereinafter be identified by $P_1$, $P_2$, $P_3$, . . .). The adder 10-2 adds the brightness level signal values of the respective meshes of the small area $P_2$.

The peak select unit 11 detects the maximum one of the outputs from the adders 10-1 to 10-12 on the small areas $P_1$ to $P_{12}$. The maximum value thus detected by peak select unit 11 is compared with the output from the aforesaid adder 9. Where the latter is larger than the former, it is quantized into a black bit as a binary signal of the central mesh depicted in FIG. 7A. In the opposite case, it is quantized into a white bit.

As the information is shifted in the shift registers shown in FIG. 6, the entire area of the input character 1 depicted in FIG. 1 is scanned by the aforesaid matrixes of $5 \times 5$ meshes and information of each mesh of the entire area of the input character 1 is quantized.

A detailed description will be given with regard to the respective parts of FIG. 6.

The information of each of $2^0$, $2^1$ and $2^2$ digits derived from the 3-bit A-D converter in FIG. 4 is applied to the shift registers 7 of each of the matrixes 5-0, 5-1 and 5-2.

As shown in FIG. 3, in the case of scanning the character, the vertical ordinates are 64 bits 0 to 63, so that, at the instant of completion of a first scanning, 59 bits are applied to the delay line 8 and the remaining 5 bits are set in the shift register 7. With five scannings, the video matrix storage 5 of $5 \times 5$ meshes is filled with the bits. At this time, the left-hand lower corner of the scanning area is scanned and the scanning signal is set in each shift register 7. At the next instant, $5 \times 5$ meshes, shifted up by one bit with respect to the vertical ordinate, are set and $5 \times 5$ meshes sequentially scan the character upwardly; and then $5 \times 5$ meshes shifted to right by one bit scan the character.

Figure 8A:
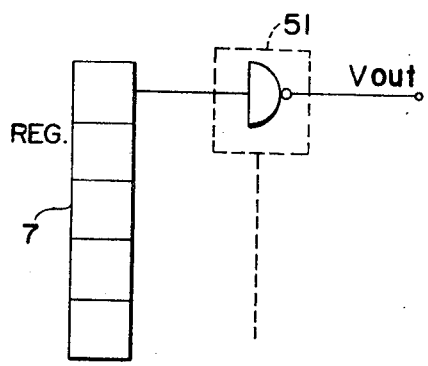
FIGS. 8A and 8B illustrate the output part of the video matrix storage in FIG. 6 and its detailed connection, respectively.

FIG. 8A illustrates the output stage of each register 7. In each bit of the register 7, "1" or "0" of the $2^0$, $2^1$ or $2^2$ digit of the brightness level signal is set. In the present example, the output from the register 7 is derived through a transistor-resistor logic 51 of open collector construction. The reason therefor is that an accurate on-off output voltage is required to be taken out for achieving an analog operation at the subsequent stage.

Figure 8B:
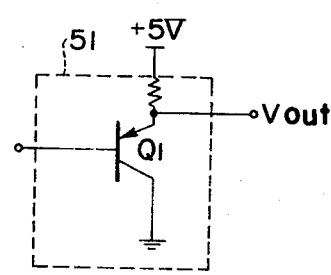

As illustrated in FIG. 8B, the transistor-resistor logic 51 of open collector construction is connected to a stabilizing power source (+5V) through a resistor. When supplied with "1" of high level from the register 7, the transistor Q1 is put in its off state to derive the power source voltage 5V at its output terminal V out. On the other hand, when supplied with "0" of low level, the transistor Q1 is put in its on state to provide 0V at the output terminal V out.

Employing the stabilizing power source 5V as described above, causes the register 7 output to have an accurate voltage of either 0V or 5V, and which permits accurate additive operation at the next stage. If the output from an ordinary shift register is taken out as is, dispersion of about 3.0 to 4.5V is caused in the output.

FIG. 9 shows principles of one example of each of the adders 9 and 10-1 to 10-12 in FIG. 6 and is explanatory of one mesh point of the 5 × 5 meshes.

In order that 3-bit digital signals representative of the eight stages 0 to 7 may be added in the form of analog signals, D–A conversion is achieved in the adder. The circuit of FIG. 9 is formed with the simple resistance network. In FIG. 9, reference numerals $2^0$, $2^1$ and $2^2$ indicate the outputs from the registers, respectively, that is, the output voltage V out of 5 or 0V described above in connection with FIG. 8; and + 5V designates a stabilizing power source voltage. Reference characters $r_0$, $r_1$ and $r_2$ denote resistors having values which satisfy the equation $r_0 = 2r_1 = 4r_2$; and $r$ identifies resistors whose values are negligibly small, as compared with that of the resistor $r_2$.

When only the register output $2^0$ is 5V and the others are 0V, if the resistors $r$ are neglected, a voltage of 5/7V is derived at the output terminal Vout. By combining the outputs $2^0$, $2^1$ and $2^2$ with one another as mentioned above, the 3-bit indications of binary-coded decimal numbers can be provided in the form of voltage values of eight stages between 0 to 5V at the output terminal Vout, as shown in FIG. 9B, so that efficient and economical D–A conversion can be achieved.

FIG. 10 illustrates the connection of the adder (refer to 10-1 to 10-12 in FIG. 6) for the four mesh points in the aforementioned small area in FIG. 7B.

As described above with regard to FIG. 9, the output of one mesh point is divided into eight voltages between 0 to 5V, so that, by connecting the outputs of the four mesh points in parallel as depicted in FIG. 10, the outputs can be provided in the form of 32 voltage values between 0 to 5V at the output terminal Vout. In FIG. 10, the stabilizing power source is left out for the sake of brevity.

Figure 12:
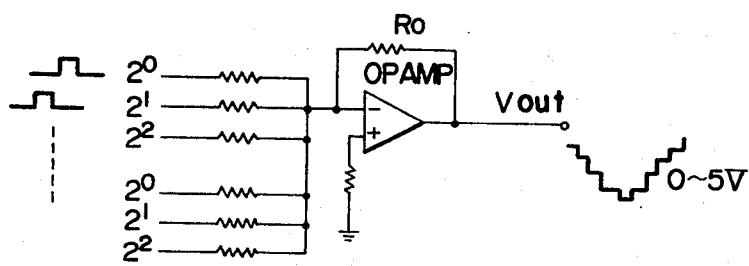
FIG. 12 is a connection diagram showing another example of the adder circuit in FIG. 6.

Strictly speaking, the output obtained by the above method is not an added one but the resulting output is nothing but one proportional to the sum of the outputs of the four mesh points. The real addition is possible, of course, with an adder as shown in FIG. 12 but this presents problems of reverse polarity at the output, economy and the frequency characteristic.

The circuit of FIG. 10 lacks the above problems.

Also in the case of obtaining the sum of the outputs of nine mesh points of the central part as shown in FIG. 7A, the nine outputs are connected in parallel in exactly the same manner as in FIG. 10, except that the central mesh 13 is weighted 4 times, as previously explained.

FIG. 11 is a connection diagram illustrating one example of the peak select unit 11 in FIG. 6.

In FIG. 11, twelve sums of the outputs Vout of the four mesh points depicted in FIG. 10 are led out and each connected with a diode 61. A current is caused to flow by a common negative voltage source −V. The diode switches 61 are put in their on or off state depending upon the potential at a point 62. Where the voltage at each output Vout is positive, and the point 62 is equipotential to the largest value of output voltage Vout of, the diodes connected to the other output voltages Vout are all put in their off state. Accordingly, only the output voltage of the four mesh points having the largest value is derived at the output terminal Out.

FIG. 12 is a connection diagram illustrating one example of each of the adders 9 and 10-1 to 10-2 in FIG. 6.

The adders of FIGS. 9 and 10 produce an output in proportion to the sum of the outputs from the registers, but the output Vout derived from the adder of FIG. 12 is the actual sum of the register outputs.

By connecting the outputs $2^0$, $2^1$ and $2^2$ of the respective mesh points in parallel with one another and applying them to an operational amplifier OP·AMP, there is obtained at the output Vout a value that the brightness level values of the respective mesh points of such small areas as shown in FIGS. 7A and 7B. However, the adder of this example has such disadvantages as negative polarity of the output waveform, necessity to provide many operational amplifiers, and the problem of the frequency characteristic. In the case of adding the small region of nine meshes in FIG. 7A, and the case of adding the four meshes in FIG. 7B by the use of the circuit of FIG. 12, respectively, it is necessary to compensate for the difference according to the individual areas. A feedback resistor $R_0$ gives a constant ratio to the operational amplifier OP·AMP, so as to make the levels equal for comparison at the subsequent stage.

FIG. 13A is a diagram showing a system for detecting the maximum value of the surrounding small areas in FIG. 6 and FIG. 13B is a diagram showing a system for detecting the brightness level of the central part including the point to be quantized.

In FIG. 13A, the output of the small areas are led out from the matrixes 5-0, 5-1 and 5-2, respectively. The sum of the outputs is obtained in the part indicated by 71 and the largest value of the outputs is detected in the part indicated by 72 to obtain an output of the environment part (ENVIRON). In FIG. 13B, the outputs of the nine mesh points of the central part are led out and the sum of the outputs is obtained in the part indicated by 73 to provide an output of the central part (CENTER).

FIG. 14 is a connection diagram of a comparator circuit 12 for comparing the outputs of the central part and the environmental part.

As shown in FIG. 6, too, the output from the adder 9 for the central part and the output of the maximum value among the outputs from the adders 10-1 to 10-12 for the surrounding small areas are applied to a comparator circuit 12. In FIG. 14, amplifiers AMP are provided for adjusting the DC levels and the signal amplitudes of the above outputs in the comparison thereof. Where the output of the central part is larger than that of the surrounding part, the output of the mesh of the central point is quantized into a binary signal of black and, in the opposite case, the output of the mesh of the central part is quantized into binary signal of white.

FIG. 15A shows the outputs from the adder 9 and the peak select unit 11, which are depicted in FIG. 6, in solid line and broken line, respectively. FIG. 15B shows quantized binary information.

As diagrammatically shown, the threshold level (in broken line) from the maximum peak select unit 11 is affected by the presence of a character stroke, while a low print-quality spot noise, in the vicinity of a character stroke of high print quality, is removed. Ambiguity at the marginal edge of the character stroke is removed and processing is achieved so that a clear marginal edge of the character stroke is provided. In FIG. 15A, a noise cut level refers to a noise due to dispersion in circuit elements. The level is set when the amplifiers AMP are adjusted.

Figure 16A:
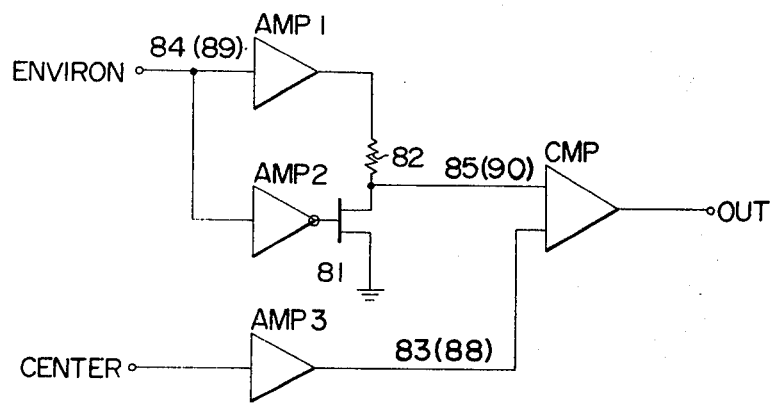
FIGS. 16A, 16B and 16C are diagrams showing another example of the comparator circuit for comparing the output of the central part with the maximum output of the environmental part.

FIG. 16A is a connection diagram illustrating another example of the comparison of the output of the central part with the maximum value of the surrounding part.

By comparing the maximum value of the output level of the surrounding part with the output level of the central part, "1" is derived at the output OUT when the output level of the central part is higher and "0" is obtained when the output level of the surrounding part is higher. In such a case, the output level of the surrounding part is impedance-divided by a field effect transistor 81 and a resistor 82 and then applied to a comparator circuit CMP. The source-grounded field effect transistor 81 changes the impedance between its source and drain with the gate signal, that is, the level signal of the surrounding part, and hence serves as a self-control attenuator. Namely, when the output signal of the surrounding signal $V_E$ is relatively small, the impedance $R_{81}$ between the source and drain of the field effect transistor 81 becomes small, so that the value of the signal applied to the comparator circuit CMP is $V_E \times R_{81}/(R_{81} + R_{82})$ and applied as a relatively low level. On the other hand, when the output signal $V_E$ of the surrounding part is relatively large, it is applied as a signal of high level to the comparator circuit. In FIG. 16A, amplifiers AMP1 and AMP3 are non-invert-type and an amplifier AMP2 is invert-type.

Generally, in the case of detecting the brightness level by scanning a character, a character having a stroke of high print quality is detected sufficiently over the entire width of the stroke but a character having a stroke of low print intensity is detected at a lower level at its marginal edge and discriminated as a narrow stroke. Accordingly, even in the case of two printed characters of the same width, the character recognizing unit recognizes them as two characters having strokes of different widths because of their different print qualities.

The circuit of FIG. 16A overcomes the above defect.

Figure 16B:
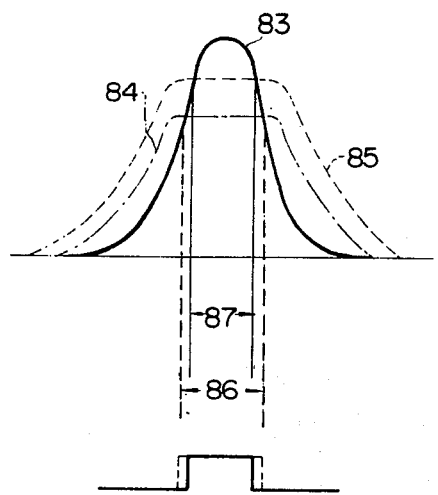

FIG. 16B shows an added output 83 of the central part, a maximum value 84 (ENVIRON) of the added output of the surrounding part of a character of high print quality, and a corrected output 84 which is a corrected value of a maximum value 84 (ENVIRON) by the circuit of FIG. 16A. A signal width which is quantized as a black level when simply applied to the comparator circuit CMP is indicated by 86, but by the correction with the circuit of FIG. 16A, a corrected output 85 of the surrounding part is applied to the comparator CMP. Therefore, the signal width which is quantized as the black level becomes such as indicated by 87 in practice.

Figure 16C:
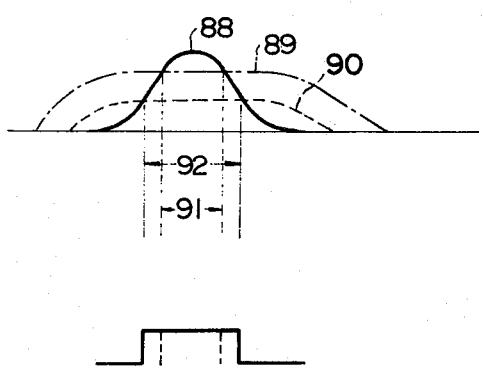

FIG. 16C shows the above outputs of a character of low print quality. When an output 89 of the surrounding part is simply applied to the comparator CMP, a signal width to be quantized as a black level is recognized narrow as indicated by 91 but, by the correction with the circuit of FIG. 16A, a corrected output of the surrounding part is applied to the comparator circuit CMP, so that the signal width to be quantized as the black level is enlarged, in practice, as indicated by 92.

By making the output of the surrounding part large or small depending upon whether the print quality is high or low, the comparator circuit comes to have a nonlinear characteristic, so that even where a change in the darkness exists between different characters or different parts of the same character, the character recognizing unit can recognize the width of the stroke with accuracy.

Figure 17:
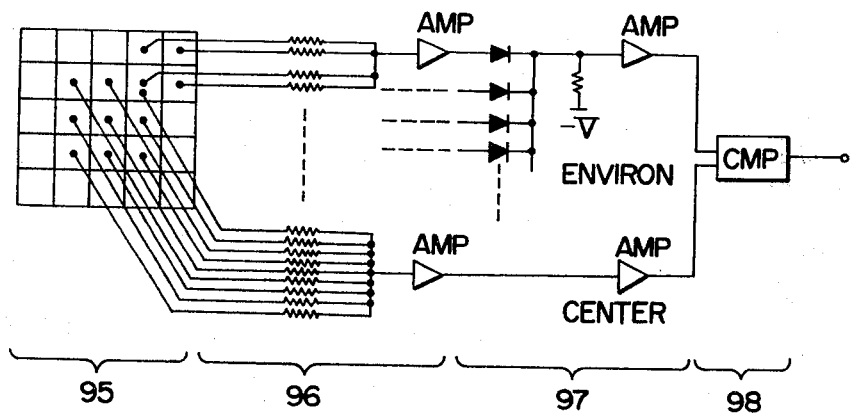
FIG. 17 is a connection diagram illustrating another example of this invention in which scanning is achieved by the use of photo transistors of two-dimensional arrangement.

FIG. 17 illustrates another example of this invention, which employs a two-dimensional arrangement of photoelectric cells.

For example, in the case of detecting the brightness level by an arrangement of photo transistors in a plane, scanning of one character as a whole is achieved at a speed depending upon the response speed of the photo transistor, so that high-speed scanning is possible. Further, since analog values of character signals are obtained, the delay circuits and the shift registers employed in the foregoing examples become unnecessary. Namely, analog signals of the brightness of the respective meshes of each area of the surrounding part and the central area are taken out simultaneously in a part 95 and added in a part 96, a maximum value of only the surrounding part is detected and, at the same time, the DC level and the signal amplitude of the central area are adjusted in a part 97 and, finally, the maximum value of the surrounding part and the output of the central area are compared with each other in a part 98.

With the system of FIG. 17, the character recognizing unit can perform a higher degree of processing and eliminate the intermediate processing in the case of employing the one-dimensional arrangement of photoelectric cells.

As has been described in the foregoing, according to this invention, the brightness level of a mesh point to be quantized and the highest brightness level of the small areas surrounding the mesh point are compared with each other and when the latter exhibits higher print quality than the former, the mesh point to be quantized is quantized as a white bit. This removes ambiguity at the marginal edge of a character stroke to make the marginal edge clear and eliminates spot noises. Further, this invention overcomes the defects encountered in the system of FIG. 1 illustrated as the prior art.

It will be apparent that many modifications and variations may be effected without departing from the scope of the novel concepts of this invention. Therefore, it is intended by the appended claims to cover all such modifications and variations which fall within the true spirit and scope of the invention.

We claim as our invention:

1. A character signal processing system for quantizing a character into binary signals according to the brightness thereof, said system comprising:
   means for scanning the character and providing analog signals corresponding to the brightness thereof;
   means for converting said analog signals into digital signals, each having a predetermined number of digits;
   means for storing said converted digital signals and providing a first digital signal of a first portion of the character information to be quantized, second digital signals corresponding to second portions surrounding said first portion and third digital signals corresponding to third portions adjoining said second portions;
   first means for receiving said first and second digital signals and providing as an output the sum thereof;
   a plurality of second means, each for receiving selected second digital signals and the adjoining, third digital signals and providing as an output the sum thereof;
   third means for receiving the sums from said plurality of said second means, selecting and providing an output of the largest one of those sums, and
   means for comparing the output sum from said first means with the largest sum from said third means and providing as an output one binary signal when said output from said first means is larger than said output from said third means and another binary signal when said output from said first means is smaller than said output from said third means, thereby quantizing the character into said binary signals.

2. A character signal processing system as claimed in claim 1, wherein said storing means has an "$m \times n$" matrix and a center portion for storing the first digital signal.

3. A character signal processing system as claimed in claim 1, further comprising:
   a variable impedance means connected to said third means, for receiving the largest sum from said third means, and connected to an input of said comparing means; and
   means for controlling said variable impedance means, whereby said means for controlling also receives the largest sum from said third means and controls the impedance of said variable impedance means according to the level of the largest sum.

4. A character signal processing system as claimed in claim 1, wherein said first and second means each comprise D/A converter means, said respective D/A converter means connect said first and second digital signals and said second and third digital signals into corresponding analog signals.

5. A character signal processing system as claimed in claim 4, wherein each said D/A converter means is connected to a common stable power source and comprises:
   resistors corresponding to the predetermined number of digits having respective resistance values based on the respective digits, one end of said resistors being commonly connected to a summing point, and the other ends thereof each being respectively connected to receive said corresponding digit of a corresponding digital signal.

6. A character signal processing system as claimed in claim 2, wherein said storing means comprises a predetermined number of registers, each register having:
   $n$ shift registers, each having $m$ digits; and
   $n-1$ delay means respectively connected between said corresponding shift registers for effecting the timing of storing said converted digital signals therein, and whereby said converted digital signals are stored in "$m \times n$" matrix form.

7. A character signal processing system as claimed in claim 1 wherein said means for scanning comprises a one-dimensional linear array of radiation sensitive cells aligned perpendicular to a scanning direction.

8. A character signal processing system as claimed in claim 1, wherein said means for scanning comprises a flying spot scanner means performing raster scanning.

9. A character signal processing system as claimed in claim 1, wherein said means for converting said analog signals into digital signals comprises a 3-bit quantizer means;
   said quantizer means having an eight amplitude level input capacity and wherein the analog signal is quantized according to its amplitude into a 3-bit digital signal.

10. A character signal processing system as claimed in claim 1, wherein each of said plurality of second means sum four digital signals; at least one of which is a selected second digital signal and at least two of which are adjoining third digital signals.

11. A character signal processing system for quantizing a character into binary signals according to the brightness thereof, comprising:
    scanning means for scanning the character and providing analog signals corresponding to the brightness thereof, said scanning means having a first sensing means for providing as an output a first analog signal corresponding to the brightness of a first portion of the character to be quantized;

a plurality of second sensing means, each for providing as an output, a second analog signal corresponding to the brightness of a second portion surrounding said first portion, and a plurality of third sensing means, each for providing as an output, a third analog signal corresponding to the brightness of a third portion adjoining said second portion;

first summing means for receiving said first and second analog signals and providing as an output the sum thereof;

a plurality of second summing means, each for receiving selected said second analog signals and the adjoining third analog signal and providing an output of the sum thereof;

a selection means for receiving the sums from said plurality of said second summing means, selecting and providing an output of the largest one of those sums; and means for comparing the output sum from said first summing means with the largest sum from said selection means and providing as an output one binary signal if said output from said first summing means is larger than said largest sum from said selection means, and another binary signal if said largest sum from said selection means is larger than said output from said first summing means, thereby quantizing the character into said binary signals.

12. A character signal processing system as claimed in claim 11, wherein said first, second and third sensing means respectively comprise photoelectric cells, which are arranged in "$m \times n$" matrix form.

* * * * *